(12) United States Patent
Momoda et al.

(10) Patent No.: US 6,802,993 B2
(45) Date of Patent: Oct. 12, 2004

(54) CURABLE COMPOSITION COMPRISING A PHOTOCHROMIC COMPOUND

(75) Inventors: Junji Momoda, Yamaguchi (JP); Toshiaki Otani, Yamaguchi (JP)

(73) Assignee: Tokuyama Corporation, Yamaguchi-Ken (JP)

( * ) Notice: Subject to any disclaimer, the term of this patent is extended or adjusted under 35 U.S.C. 154(b) by 0 days.

(21) Appl. No.: 10/148,319

(22) PCT Filed: Sep. 13, 2001

(86) PCT No.: PCT/JP01/07959

§ 371 (c)(1),
(2), (4) Date: May 29, 2002

(87) PCT Pub. No.: WO02/28930

PCT Pub. Date: Apr. 11, 2002

(65) Prior Publication Data

US 2003/0036579 A1 Feb. 20, 2003

(30) Foreign Application Priority Data

Sep. 29, 2000 (JP) ........................................ 2000-299464

(51) Int. Cl.[7] ............................. G02B 5/23; C08F 30/08
(52) U.S. Cl. ....................... 252/586; 252/582; 526/279; 526/318; 526/318.1; 526/318.2; 526/318.4; 526/318.43; 526/318.44; 526/319; 526/328; 526/328.5; 524/858
(58) Field of Search ................................ 252/582, 586, 252/588, 589; 526/279, 318, 318.1, 318.2, 318.4, 318.43, 318.44, 318.5, 319, 328, 328.5; 524/858

(56) References Cited

U.S. PATENT DOCUMENTS 5,264,465 A * 11/1993 Futamura et al. ........... 523/106
5,776,376 A * 7/1998 Nagoh et al. ............... 252/586
5,917,006 A * 6/1999 Smith et al. ................ 528/373
2003/0044620 A1 * 3/2003 Okoroafor et al. ....... 428/423.5

FOREIGN PATENT DOCUMENTS

| EP | 331217 A1 | 9/1989 | |
|---|---|---|---|
| JP | 53-7790 A | 1/1978 | |
| JP | 61-75301 A | 4/1986 | |
| JP | 10-101752 A | 4/1998 | |
| JP | 10-338869 A | 12/1998 | |
| WO | 96/37575 A1 | 11/1996 | |
| WO | WO 9938924 A1 * | 8/1999 | ............ C09D/7/12 |
| WO | WO 01/05854 | 1/2001 | |

* cited by examiner

Primary Examiner—Jeffrey B. Robertson
(74) Attorney, Agent, or Firm—Birch, Stewart, Kolasch & Birch, LLP

(57) ABSTRACT

A photochromic cured product which has excellent photochromism such as high color density and high fading speed, excellent adhesion to a hard coat and high striping work efficiency. This cured product is obtained by polymerizing and curing a curable composition which comprises (A) a polyfunctional polymerizable monomer such as trimethylolpropane trimethacrylate, (B) a silyl monomer such as γ-methacryloyloxypropyl trimethoxysilane, (C) another radically polymerizable monomer and (D) a photochromic compound. As for the contents of the polymerizable monomers, the content of the component (A) is 1 to 50 wt %, the content of the component (B) is 0.5 to 20 wt % and the balance consists of the component (C) based on the total of the components (A), (B) and (C). The photochromic compound (D) is contained in an amount of 0.0001 to 10 parts by weight based on 100 parts by weight of the total of the components (A), (B) and (C).

7 Claims, No Drawings

CURABLE COMPOSITION COMPRISING A PHOTOCHROMIC COMPOUND

This application is the national phase under 35 U.S.C. §371 of PCT International Application No. PCT/JP01/07959 which has an International filing date of Sep. 13, 2001, which designated the United States of America.

FILED OF THE INVENTION

The present invention relates to a curable composition comprising a photochromic compound and to a cured product thereof. More specifically, it relates to a curable composition which provides a photochromic cured product suitable for use as a spectacle lens or the like and to the cured product.

PRIOR ART

Photochromism is a reversible phenomenon that a certain compound changes its color immediately upon exposure to light including ultraviolet rays, such as sunlight or light from a mercury lamp and returns to its original color when it is placed in the dark by stopping exposure and is now applied in various fields.

For example, photochromism is applied in the field of spectacle lenses. A plastic lens having photochromism is obtained by curing a polymerizable monomer blended with a photochromic compound having the above property. Fulgimide compounds, spirooxazine compounds, chromene compounds and the like have been discovered as photochromic compounds which can be advantageously used in the above field.

However, when these photochromic compounds are dispersed in a polymer, color density becomes lower, or color development speed and fading speed, particularly fading speed becomes lower than when the compounds are dissolved in a solvent. Therefore, a photochromic cured product which retains the essential properties of a photochromic compound is not obtained yet.

The inventors of the present invention consider that the above phenomenon is caused by the fact that the free space where the molecules of a photochromic compound can move freely is much smaller in a matrix such as a polymer than in a solution because the phenomenon is especially marked in a photochromic compound having a large molecular size. They have proposed a curable composition which has a wide free space in the matrix of cured product as a curable composition free from the above problem (WO 01/05854). They have succeeded in obtaining a desired effect by combining a generally used polymerizable monomer and a polyfunctional polymerizable monomer having at least three polymerizable groups as radically polymerizable monomers in the above curable composition.

However, it has been found that when "a hard coat to be cured by a condensation method", which is now generally used for plastic lenses, is applied to the surface of a cured product of the above curable composition, the adhesion of the hard coat lowers.

SUMMARY OF THE INVENTION

It is an object of the present invention to provide a curable composition capable of providing a photochromic cured product which shows excellent photochromism such as high color density and high fading speed and has excellent adhesion between a matrix and the aforementioned hard coat.

It is another object of the present invention to provide a curable composition which has the above performance and excellent releasability when its cured product is to be removed from a mold such as a glass mold after polymerization.

It is still another object of the present invention to provide a photochromic cured product having the above excellent characteristic properties.

Other objects and advantages of the present invention will become apparent from the following description.

According to the present invention, firstly, the above objects and advantages of the present invention are attained by a curable composition comprising:
(A) a polyfunctional radically polymerizable monomer having at least three polymerizable groups in the molecule;
(B) a radically polymerizable monomer having a silanol group or a group capable of forming a silanol group by hydrolysis;
(C) another radically polymerizable monomer different from the above components (A) and (B); and
(D) a photochromic compound, wherein the above components (A) (B) and (C) are contained in amounts of 1 to 50 wt %, 0.5 to 20 wt % and 30 to 98.5 wt % based on the total of the components (A), (B) and (C), respectively, and the above component (D) is contained in an amount of 0.0001 to 10 parts by weight based on 100 parts by weight of the total of the above components (A), (B) and (C).

According to the present invention, secondly, the above objects and advantages of the present invention are attained by a photochromic cured product as a cured product of the curable composition of the present invention.

DETAILED DESCRIPTION OF THE PREFERRED EMBODIMENT

The curable composition of the present invention comprises radically polymerizable monomers as the above components (A), (B) and (C) and a photochromic compound as the above component (D).

In the curable composition of the present invention, a polyfunctional radically polymerizable monomer having at least three polymerizable groups in the molecule is used as the radically polymerizable monomer component (A). By using this polyfunctional radically polymerizable monomer, a photochromic cured product obtained by curing the curable composition of the present invention achieves extremely high color density and extremely high fading speed.

Any known compound may be used as the polyfunctional radically polymerizable monomer if it has at least three polymerizable groups in the molecule. It is preferably a compound having 3 to 6 polymerizable groups in the molecule because it is easily acquired industrially. The polymerizable groups mean groups having radical polymerizability.

In the curable composition of the present invention, a polyfunctional radically polymerizable monomer which gives a polymer having an L-scale Rockwell hardness of 60 or more, particularly 65 to 130 when it is homopolymerized is used as the component (A) to increase the hardness of the cured product and the fading speed of photochromism. The term "L-scale Rockwell hardness" as used herein means hardness measured in accordance with JIS-B7726. By measuring the hardness of a homopolymer of each polymerizable monomer, it can be judged simply whether the measured hardness satisfies the above requirement or not. Stated more specifically, as will be shown in examples, this can be easily confirmed by polymerizing a monomer to obtain a 2 mm-thick cured product and keeping it in a chamber maintained at 25° C. for 1 day to measure its L-scale Rockwell hardness with a Rockwell hardness meter. The cured product may be used as the above measurement sample if 90% or more of the monomer charged to obtain the cured product is polymerized. When the degree of polymerization is 90% or more, the L-scale Rockwell hardness of the cured product is measured as almost a constant value.

Examples of the polyfunctional radically polymerizable monomer which can be suitably used as the component (A) in the present invention include trimethacrylate derivatives, triacrylate derivatives, tetramethacrylate derivatives, tetraacrylate derivatives, hexaacrylate derivatives, triisocyanate derivatives, tetraisocyanate derivatives, triol derivatives, trithiol derivatives, tetrathiol derivatives, triepoxy derivatives, triurethane methacrylate derivatives, tetraurethane methacrylate derivatives, hexaurethane methacrylate derivatives, trivinyl derivatives, tetravinyl derivatives and triallyl derivatives. Out of these, trimethacrylate derivatives, triacrylate derivatives, tetramethacrylate derivatives, tetraacrylate derivatives, hexaacrylate derivatives, triurethane methacrylate derivatives, tetraurethane methacrylate derivatives and hexaurethane methacrylate derivatives have methacryloyl groups or acryloyl groups.

Further, out of these, polyfunctional radically polymerizable monomers represented by the following formulas (2) and (2') are particularly preferably used because their raw materials are easily acquired and the hardness of the cured product is easily controlled:

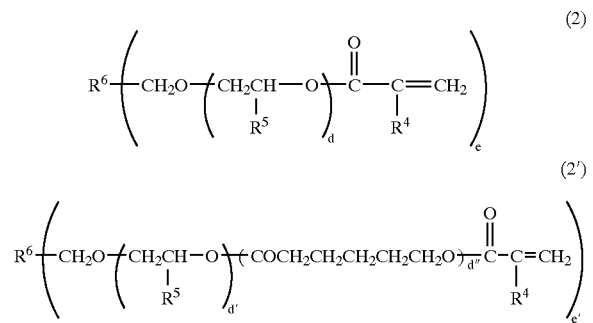

wherein $R^4$ and $R^5$ are each independently a hydrogen atom, methyl group or ethyl group, $R^6$ is a tervalent to hexavalent organic residual group, d, d' and d" are each independently an integer of 0 to 3, and e and e' are each independently an integer of 3 to 6.

Since the above compounds are each obtained as a mixture of components having different molecular weights, d to d" are average values. In the above general formulas, $R^6$ is a tervalent to hexavalent organic residual group, as exemplified by groups derived from polyols, tervalent to hexavalent hydrocarbon groups, and organic groups having an ester bond or urethane bond.

Illustrative examples of the polyfunctional radically polymerizable monomers represented by the above formulas (2) and (2') which can be advantageously used include trimethylolpropane trimethacrylate, trimethylolpropane triacrylate, tetramethylolmethane trimethacrylate, tetramethylolmethane triacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, triurethane oligomer tetraacrylate, urethane oligomer hexamethacrylate, dipentaerythritol hexaacrylate, polyester oligomer hexaacrylate and caprolactone-modified dipentaerythritol hexaacrylate. These polyfunctional radically polymerizable monomers may be used in combination of two or more.

The amount of the component (A) must be 1 to 50 wt % based on the total of all the polymerizable monomers (that is, the total of the components (A), (B) and (C)) of the curable composition of the present invention. When the amount is smaller than 1 wt %, the fading speed of photochromism does not become sufficiently high and when the amount is larger than 50 wt %, the cured product becomes brittle disadvantageously. From the viewpoints of the photochromism and strength of the cured product, the amount of the component (A) is preferably 2 to 40 wt %, particularly preferably 2 to 30 wt % based on the total of all the polymerizable monomers.

The polymerizable monomers used in the curable composition of the present invention must include a radically polymerizable monomer (may be referred to as "silyl monomer" hereinafter) having a silanol group or a group capable of forming a silanol group by hydrolysis as the component (B). By containing the silyl monomer, adhesion between a photochromic cured product obtained by curing the curable composition of the present invention and a hard coat cured by a condensation method is greatly improved. Any known compound may be used as the silyl monomer if it has a silanol group (≡Si—OH) or a group which forms a silanol group by hydrolysis and a radically polymerizable group.

Illustrative examples of the group which forms a silanol group by hydrolysis include an alkoxysilyl group (≡Si—O—R; R is an alkyl group), aryloxysilyl group (≡Si—O—Ar; Ar is an aryl group which may be substituted), halogenated silyl group (≡Si—X; X is a halogen atom) and silyloxysilyl group (disiloxane bond; ≡Si—O—Si≡).

Out of these groups which form a silanol group by hydrolysis, an alkoxysilyl group or silyloxysilyl group is preferred, an alkoxysilyl group having an alkoxyl group with 1 to 4 carbon atoms is more preferred, and a methoxysilyl group or ethoxysilyl group is the most preferred because it easily forms a silanol group and is easily synthesized and stored, and a group eliminated from a silicon atom by a reaction has little influence upon the physical properties of the cured product.

As the radically polymerizable group may be used any known radically polymerizable group such as (meth)acryloyl group, derivative group of a (meth)acryloyl group such as (meth)acryloyloxy group, (meth)acryloylamino group or (meth)acryloylthio group, vinyl group, allyl group or styryl group. When the radically polymerizable group is a vinyl group, allyl group or styryl group, the radically polymerizable group may have a substituent. Examples of the substituent include alkyl groups and haloalkyl groups having 1 to 4 carbon atoms such as methyl group, ethyl group, propyl group, butyl group, chloromethyl group and trifluoromethyl group, halogen atom, cyano group, nitro group and hydroxyl group. When the radically polymerizable group is a (meth)acryloylamino group, the amidonitrogen atom of the group may be bonded to an organic group such as a substituted or nonsubstituted alkyl group, aryl group or allyl group in addition to a group having the (meth)acryloyl group and the silanol group or group which forms a silanol group by hydrolysis.

Out of these radically polymerizable groups, a (meth)acryloyl group or (meth)acryloyloxy group is preferred and a (meth)acryloyloxy group is more preferred from the viewpoints of acquisition ease and high polymerizability.

Illustrative examples of the silyl monomer which can be advantageously used in the present invention include γ-methacryloyloxypropyl trimethoxysilane, γ-methacryloyloxypropyl triethoxysilane, γ-methacryloyloxypropyl methyldimethoxysilane, (3-acryloxypropyl)dimethylmethoxysilane, (3-acryloxypropyl)methyldimethoxysilane, (3-acryloxypropyl)trimethoxysilane, 3-(N-allylamino)propyltrimethoxysilane, allyldimethoxysilane, allyltriethoxysilane, allyltrimethoxysilane, 3-aminophenoxydimethylvinylsilane, 4-aminophenoxydimethylvinylsilane, 3-(3-aminopropoxy)-3,3-dimethyl-1-propenyl trimethoxysilane, butenyltriethoxysilane, 2-(chloromethyl)allyl trimethoxysilane, diethoxyvinylsilane, 1,3-divinyltetraethoxydisiloxane, docosenyltriethoxysilane, O-(methacryloxyethyl)-N-(triethoxysilylpropyl)urethane, N-(3-methacryloxy-2-hydroxypropyl)-3-aminopropyl triethoxysilane, methacryloxyethoxy trimethylsilane, (methacryloxymethyl)dimethylethoxysilane, methacryloxymethyl triethoxysilane, methacryloxymethyl trimethoxysilane, methacryloxypropyl dimethylethoxysilane, methacryloxypropyl dimethylmethoxysilane, methacryloxypropyl tris(methoxyethoxy)silane, 7-octenyltrimethoxysilane, 1,3-bis(methacryloxy)-2-trimethylsiloxypropane, tetrakis(2-methacryloxyethoxy) silane, trivinyl ethoxysilane, trivinyl methoxysilane, vinyldimethyl ethoxysilane, vinyldiphenyl ethoxysilane, vinylmethyl diacetoxysilane, vinylmethyl diethoxysilane, vinylmethyl dimethoxysilane, O-(vinyloxyethyl)-N-(triethoxysilylpropyl)urethane, vinyloxytrimethylsilane, vinylphenyl diethoxysilane, vinylphenyl methylmethoxysilane, vinyl triacetoxysilane, vinyl tri-t-butoxysilane, vinyl triethoxysilane, vinyl triisopropenoxysilane, vinyl triisopropoxysilane, vinyl trimethoxysilane, vinyl triphenoxysilane and vinyl tris(2-methoxyethoxy)silane.

Out of these silyl monomers, a monofunctional methacrylate compound having a silyl group, represented by the following formula (1), is preferably used as the component (B) because it is easily acquired and has the large effect of improving the adhesion of a hard coat without reducing the physical properties of the cured product:

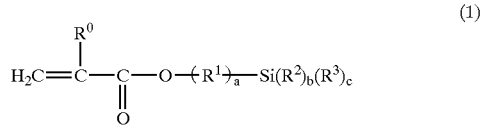

(1)

wherein $R^0$ is a hydrogen atom or methyl group, $R^1$ is an alkylene group having 1 to 20 carbon atoms, $R^2$ is an alkyl group or alkoxy group, $R^3$ is an alkoxy group, a is 1, b is an integer of 0 to 2, and c is an integer of 1 to 3, with the proviso that b+c =3.

From the viewpoint of adhesion to a hard coat, preferably, the alkylene group represented by $R^3$ is an alkylene group having the structure in which an alkylene group having 1 to 4 carbon atoms such that methylene group, ethylene group, propylene group or butylene group is recured 1 to 5 times. The alkylene group is the most preferably a methylene group, ethylene group or propylene group.

For the same reason, the alkyl group and alkoxy group represented by $R^2$ are preferably an alkyl group having 1 to 4 carbon atoms such as methyl group, ethyl group, propyl group or butyl group and an alkoxy group having 1 to 4 carbon atoms such as methoxy group, ethoxy group, propoxy group or butoxy group, respectively. Examples of the alkoxy group represented by $R^3$ are the same as those listed for the alkoxy group represented by $R^2$ and an alkoxy group having 1 to 4 carbon atoms is preferred out of these as well.

In the formula, a is 1. b indicative of the number of $R^2$ s is an integer of 0 to 2, preferably an integer of 0 to 1. c indicative of the number of $R^3$'s is an integer of 1 to 3, preferably an integer of 2 to 3. The total of b and c is 3.

Illustrative examples of the silyl monomer represented by the above formula (1) include γ-methacryloyloxypropyl trimethoxysilane, γ-methacryloyloxypropyl triethoxysilane, γ-methacryloyloxypropyl methyldimethoxysilane, (3-acryloxypropyl)dimethylmethoxysilane, (3-acryloxypropyl)methyldimethoxysilane, (3-acryloxypropyl) trimethoxysilane, (methacryloxymethyl)dimethylethoxysilane, methacryloxymethyl triethoxysilane, methacryloxymethyl trimethoxysilane, methacryloxypropyl dimethylethoxysilane and methacryloxypropyl dimethylmethoxysilane.

The amount of the silyl monomer must be 0.5 to 20 wt % based on the total of all the polymerizable monomers used in the curable composition of the present invention. When the amount is smaller than 0.5 wt %, adhesion between the obtained cured product and the hard coat worsens and when the amount is larger than 20 wt %, adhesion between a mold such as a glass mold and the cured product improves during polymerization, thereby deteriorating releasability when the cured product is removed from the mold or other physical properties. The amount of the component (B) is preferably 1 to 10 wt %, particularly preferably 2 to 10 wt % based on the total of all the polymerizable monomers from the viewpoint of balance between the adhesion of the hard coat and releasability.

The radically polymerizable monomers in the curable composition of the present invention include the component (C) which is a radically polymerizable monomer other than the components(A)and(B). Any known radically polymerizable monomer may be used as the component (C) if it differs from the components (A) and (B). It is preferred to use at least one radically polymerizable monomer selected from the group consisting of (i) a bifunctional polymerizable monomer which homopolymer has a L-scale Rockwell hardness of 60 or more, preferably 65 to 130 (to be simply referred to as "high-hardness bifunctional monomer" hereinafter), (ii) a polymerizable monomer having at least one radically polymerizable group and at least one epoxy group in the molecule (to be simply referred to as "epoxy-based monomer" hereinafter), (iii) a polymerizable monomer which homopolymer has a L-scale Rockwell hardness of 40 or less (to be simply referred to as "low-hardness monomer" hereinafter), (iv) a polymerizable monomer comprising a specific allyl ether compound or allyl thioether compound (to be simply referred to as "allyl (thio)ether-based monomer" hereinafter) and (v) a polymerizable monomer other than the above (i) to (iv) (to be simply referred to as "other monomer" hereinafter) in order to obtain a cured product having excellent basic properties such as hardness and heat resistance and excellent photochromism. The amount of the component (C) is 30 to 98.5 wt %, preferably 50 to 97 wt %, particularly preferably 60 to 96 wt % based on the total of all the polymerizable monomers.

A description is subsequently given of each of the above radically polymerizable monomers.

The above high-hardness bifunctional monomer (i)serves to improve the basic properties such as hardness and heat resistance of the obtained cured product. The high-hardness bifunctional monomer is not particularly limited if it satisfies the above requirement. Examples of the monomer include dimethacrylate derivatives, diacrylate derivatives, divinyl derivatives, diallyl derivatives, dicyano derivatives, diol derivatives, dithiol derivatives, urethane dimethacrylate derivatives, urethane diacrylate derivatives and diepoxy derivatives. Out of these, dimethacrylate derivatives, diacrylate derivatives, divinyl derivatives, urethane dimethacrylate derivatives and urethane diacrylate derivatives having methacryloyl groups or acryloyl groups are preferred from the viewpoint of moldability.

Further, bifunctional polymerizable monomers represented by the following formulas (3) and (4) are particularly preferably used because their raw materials are easily acquired and the hardness of the cured product is easily controlled.

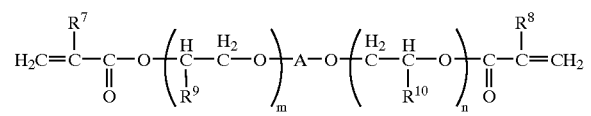
(3)

wherein $R^7$ and $R^8$ are each independently a hydrogen atom or methyl group, $R^9$ and $R^{10}$ are each independently a hydrogen atom, methyl group or ethyl group, A is a linear or branched alkylene group, substituted or nonsubstituted phenylene group, group represented by the following formula:

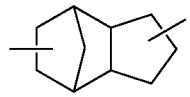

or group represented by the following formula:

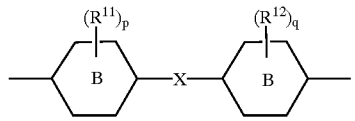

(wherein $R^{11}$ and $R^{12}$ are each independently an alkyl group having 1 to 4 carbon atoms, such as methyl group, ethyl group, propyl group or butyl group, chlorine atom or bromine atom, p and q are each independently an integer of 0 to 4, and B is a benzene ring or cyclohexane ring, with the proviso that when B is a benzene ring, X is group represented by

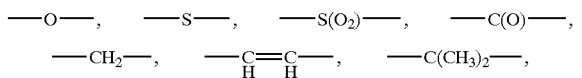

—C(CH$_3$)(C$_6$H$_5$)— or the following formula:

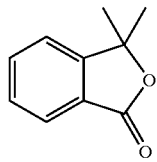

and when B is a cyclohexane ring, X is group represented by —O—, —S—, —CH$_2$— or —C(CH$_3$)$_2$—),
m and n are each an integer of 0 to 6, the average value of m+n is 1 to 6, preferably 2 to 6, when $R^7$ and $R^8$ are both a methyl group and 1 to 3 when $R^7$ and $R^8$ are both a hydrogen atom.

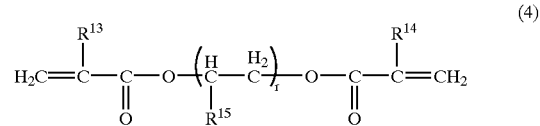
(4)

wherein $R^{13}$ and $R^{14}$ are each independently a hydrogen atom or methyl group, $R^{15}$ is a hydrogen atom, methyl group or ethyl group, and r is an integer of 1 to 10, with the proviso that r is an integer of 1 to 10, preferably 2 to 9, when $R^{13}$ and $R^{14}$ are both a methyl group and 1 to 3 when $R^{13}$ and $R^{14}$ are both a hydrogen atom.

The groups represented by the above symbols in the above formula (3) are as defined above. The linear or branched alkylene group represented by A preferably has 2 to 9 carbon atoms, as exemplified by ethylene group, propylene group, butylene group, neopentylene group, hexylene group and nonylene group. The substituent of the phenylene group represented by A is preferably an alkyl group having 1 to 4 carbon atoms such as methyl group, ethyl group, propyl group or butyl group, chlorine atom, bromine atom or the like.

Since the bifunctional polymerizable monomer represented by the formula (3) is generally obtained as a mixture of molecules which differ from each other in the values of m and n, the average value of m+n is given to define m and n in the above formula.

Examples of the monomer represented by the formula (3) include ethylene glycol diacrylate, triethylene glycol diacrylate, diethylene glycol dimethacrylate, triethylene glycol dimethacrylate, tetraethylene glycol dimethacrylate, tripropylene glycol dimethacrylate, tetrapropylene glycol dimethacrylate, ethylene glycol bisglycidyl methacrylate, bisphenol A dimethacrylate, 2,2-bis(4-methacryloyloxyethoxyphenyl)propane and 2,2-bis(3,5-dibromo-4-methacryloyloxyethoxyphenyl) propane. Examples of the monomer represented by the formula (4) include 1,4-butylene glycol dimethacrylate, 1,9-nonylene glycol dimethacrylate and neopentylene glycol dimethacrylate. These bifunctional polymerizable monomers may be used in combination of two or more.

The amount of the high-hardness bifunctional monomer is preferably 30 to 90 wt %, particularly preferably 40 to 80 wt % based on the total weight of all the radically polymerizable monomers.

By adding the above epoxy-based monomer (ii), photochromism durability is improved. The epoxy-based monomer is preferably a compound represented by the following formula (5):

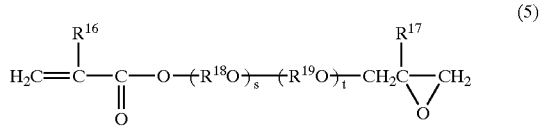
(5)

wherein $R^{16}$ and $R^{17}$ are each independently a hydrogen atom or methyl group, $R^{18}$ and $R^{19}$ are each independently an alkylene group having 1 to 4 carbon atoms which may be substituted by a hydroxy group or group represented by the following formula:

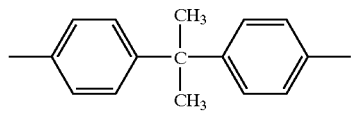

and s and t are each an integer of 0 to 20.

Examples of the alkylene group represented by $R^{18}$ and $R^{19}$ include methylene group, ethylene group, propylene group, butylene group, trimethylene group and tetramethylene group.

Preferred examples of the compound represented by the above formula (5) include glycidyl acrylate, glycidyl methacrylate, β-methylglycidyl methacrylate, bisphenol A-monoglycidyl ether-methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate and glycidyloxy polyethylene glycol methacrylate having an average molecular weight of 540. Out of these, glycidyl acrylate, glycidyl methacrylate and glycidyloxy polyethylene glycol methacrylate having an average molecular weight of 540 are particularly preferred.

The amount of the epoxy-based monomer is preferably 0.01 to 30 wt %, particularly preferably 0.1 to 20 wt % based on the total weight of all the radically polymerizable monomers.

The low-hardness monomer (iii) serves to improve the strength of the cured product and the fading speed of photochromism. The low-hardness monomer is particularly preferably used in conjunction with the above high-hardness bifunctional monomer (i).

The above low-hardness monomer is preferably a compound represented by the following formula (6) or (7).

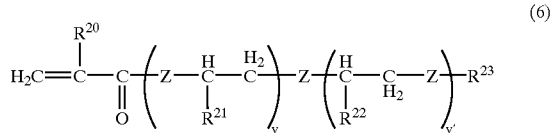

wherein $R^{20}$, $R^{21}$ and $R^{22}$ are each independently a hydrogen atom, methyl group or ethyl group, $R^{23}$ is a hydrogen atom, alkyl group having 1 to 25 carbon toms, alkoxyalkyl group, aryl group, acyl group, alkyloxy group having an epoxy group at a terminal, methacryloyl group, acryloyl group, haloalkyl group or oleyl group, Z is an oxygen atom or sulfur atom, and v and v' are each an integer of 0 to 70, with the proviso that when $R^{20}$ is a methyl group or ethyl group and $R^{23}$ is a group other than methacryloyl group and acryloyl group, v and v' are an integer of 4 to 70 and an integer of 0 to 70, respectively, when $R^{20}$ is a methyl group or ethyl group and $R^{23}$ is a methacryloyl group or acryloyl group, v and v' are an integer of 7 to 70 and an integer of 0 to 70, respectively, and when $R^{20}$ is a hydrogen atom, v and v' are an integer of 4 to 70 and an integer of 0 to 70, respectively.

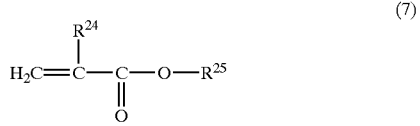

wherein $R^{24}$ is a hydrogen atom or methyl group, and $R^{25}$ is an alkyl group having 1 to 20 carbon atoms when $R^{24}$ is a hydrogen atom and an alkyl group having 8 to 40 carbon atoms when $R^{24}$ is a methyl group.

Preferred examples of the compound represented by the above formula (6) include polyalkylene glycol (meth) acrylates such as polyethylene glycol methacrylate, polyethylene glycol methacrylate, methyl ether polyethylene glycol methacrylate, methyl ether polyethylene glycol methacrylate, polypropylene glycol methacrylate, polypropylene glycol methacrylate,polypropylene glycol methacrylate, methyl ether polypropylene glycol methacrylate, polytetramethylene glycol methacrylate, octylphenyl ether polyethylene glycol methacrylate, nonyl ether polyethylene glycol methacrylate, methyl ether polyethylene thioglycol methacrylate and perfluoroheptyl ethylene glycol methacrylate; polyalkylene glycol diacrylates such as trialkylene glycol diacrylate, tetraalkylene glycol diacrylate and nonylalkylene glycol diacrylate; and polyalkylene glycol dimethacrylates such as nonylalkylene glycol dimethacrylate and tetradecanealkylene glycol dimethacrylate. Out of these, methyl ether polyethylene glycol methacrylate, methyl ether polyethylene glycol methacrylate, tetraalkylene glycol diacrylate and nonylalkylene glycol diacrylate are particularly preferred. The compound represented by the above formula (6) preferably has an average molecular weight of 360 to 2,000.

Preferred examples of the compound represented by the above formula (7) include stearyl methacrylate, lauryl methacrylate, ethyl hexyl methacrylate, methyl acrylate, ethyl acrylate, butyl acrylate and lauryl acrylate. Out of these, methyl acrylate, ethyl acrylate, butyl acrylate and lauryl acrylate are particularly preferred.

The amount of the low-hardness monomer is preferably 0.1 to 20 wt %, particularly preferably 0.5 to 10 wt % based on the total weigh of all the radically polymerizable monomers.

The above allyl ether-based monomer (iv) serves to improve the fading speed of photochromism. The allyl ether-based monomer is an allyl (thio)ether compound, that is, allyl ether compound or allyl thioether compound represented by the following formula (8):

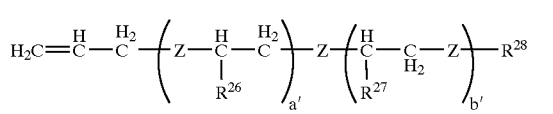

wherein $R^{26}$ and $R^{27}$ are each independently a hydrogen atom or alkyl group, $R^{28}$ is an alkyl group, acyl group, acryloyl group, methacryloyl group, vinyl group or styryl group, Z is an oxygen atom or sulfur atom, a' and b' are each independently an integer of 0 to 20, and the average value of a'+b' is 3 to 20.

The alkyl group represented by $R^{26}$ and $R^{27}$ in the above formula preferably has 1 to 2 carbon atoms, as exemplified by methyl group and ethyl group. Examples of the alkyl group represented by $R^{28}$ are preferably the same as those listed for $R^{26}$ and $R^{27}$. Further, the acyl group represented by $R^{28}$ preferably has 2 to 15 carbon atoms, as exemplified by acetyl group, propionyl group, butyryl group, benzoyl group and naphthoyl group.

The monomer represented by the above formula is generally obtained as a mixture of molecules having different molecular weights. Therefore, a' and b' each indicative of the number of alkylene oxide units in the above formula (8) represent the average numbers of the units in the whole mixture. In this case, a' and b' are each independently an integer of 0 to 20 and the average value of a'+b' is 3 to 20. When one of a' and b' is 0, the alkylene oxide units are of the same type and when a' and b' are both an integer other than 0, there are a plurality of recurring blocks each consisting of different types of alkylene oxide units.

In the present invention, to obtain excellent photochromism in terms of color density and fading speed, $R^{26}$ and $R^{27}$ in the above formula (8) are particularly preferably a hydrogen atom or alkyl group having 1 to 2 carbon atoms, $R^{28}$ is particularly preferably an alkyl group having 1 to 2 carbon atoms or acyl group having 2 to 10 carbon atoms, a' and b' are each independently an integer of 0 to 10, and the average value of a'+b' is particularly preferably 4 to 12.

Illustrative examples of the allyl ether-based monomer which is advantageously used in the present invention include methoxypolyethylene glycol allyl ethers, methoxypolyethylene glycol allyl ethers, methoxypolyethylene glycol allyl ethers, polyethylene glycol allyl ethers, methoxypolyethylene glycol-polypropylene glycol allyl ethers, butoxypolyethylene glycol-polypropylene glycol allyl ethers, methacryloxypolyethylene glycol-polypropylene glycol allyl ethers, phenoxypolyethylene glycol allyl ethers, methacryloxypolyethylene glycol allyl ethers, acryloxypolyethylene glycol allyl ethers, vinyloxypolyethylene glycol allyl ethers, styryloxypolyethylene glycol allyl ethers and methoxypolyethylene thioglycol allyl thioethers. The allyl ether-based monomer preferably has an average molecular weight of 350 to 1,600. These compounds may be used alone or in combination.

The amount of the allyl ether-based monomer is preferably 0.01 to 30 wt %, particularly preferably 0.1 to 20 wt % based on the total weight of all the radically polymerizable monomers.

Examples of the other monomer (v) include monofunctional polymerizable monomers bifunctional (meth) acrylates such as polytetramethylene glycol dimethacrylate and polytetramethylene glycol dimethacrylate; polyallyl compounds such as diallyl phthalate, diallyl isophthalate, diallyl tartarate, diallyl epoxy succinate, diallyl fumarate, diallyl chlorendate, diallyl hexaphthalate and allyl diglycol carbonate; polyvalent thioacrylate and polyvalent thiomethacrylate compounds such as 1,2-bis(methacryloylthio) ethane, bis(2-acryloylthioethyl)ether and 1,4-bis (methacryloylthiomethyl)benzene; unsaturated carboxylic acids such as acrylic acid, methacrylic acid and maleic anhydride; acrylate and methacrylate compounds such as methyl methacrylate, butyl methacrylate, benzyl methacrylate, phenyl methacrylate, 2-hydroxyethyl methacrylate and biphenyl methacrylate; fumarate compounds such as diethyl fumarate and diphenyl fumarate; thioacrylate and thiomethacrylate compounds such as methyl thioacrylate, benzyl thioacrylate and benzyl thiomethacrylate; vinyl compounds such as styrene, chlorostyrene, methylstyrene, vinylnaphthalene, α-methylstyrene dimer, bromostyrene and divinylbenzene; (meth)acrylates whose hydrocarbon chain having an unsaturated bond in the molecule has 6 to 25 carbon atoms, such as oleyl methacrylate, nerol methacrylate, geraniol methacrylate, linalool methacrylate and farnesol methacrylate; and thioether methacrylates such as bis(2-methacryloyloxyethylthioethyl)sulfide. They may be used alone or in combination of two or more, and further in conjunction with the above bifunctional polymerizable monomer, low-hardness monomer and epoxy-based monomer.

The another radically polymerizable monomer (C) is particularly preferably a combination of the above components (i), (ii) and (iii), a combination of the above components (i), (ii), (iii) and (v), a combination of the above components (i), (ii) and (iv) or a combination of the above components (i), (ii), (iv) and (v).

Any known photochromic compound may be used as the photochromic compound which is used as the component (D) in the curable composition of the present invention. Illustrative examples of the photochromic compound include fulgimide compounds, spirooxazine compounds and chromene compounds which are well known as photochromic compounds and may be used alone or in combination in the present application.

The above fulgimide compounds, spirooxazine compounds and chromene compounds are disclosed for example in JP-A 2-28154, JP-A 62-288830, PCT International Application No. 94/22850 and PCT 96/14596.

The compounds which were newly discovered by the inventors of the present invention as a compound having excellent photochromism, that is, photochromic compounds disclosed in JP-A 10-857943, JP-A 2000-219686, JP-A 2000-229973, JP-A 2000-229975, JP-A 2000-229974, JP-A 2000-344761, JP-A 2000-327676, JP-A 2000-347346, JP-A 2001-192378, JP-A 2000-619800, JP-A 2000-344762, JP-A 2001-011067 and JP-A 2001-011066 may also be advantageously used.

Out of these photochromic compounds, chromene compounds can be particularly preferably used because they have higher photochromism durability and improve the color density and fading speed of photochromism of the present invention more than the other photochromic compounds. Out of the chromene compounds, compounds having a molecular weight of 540 or more can be particularly preferably used because they improve the color density and fading speed of photochromism more than the other chromene compounds.

The chromene compound which can be advantageously used in the present invention is, for example, a compound represented by the following formula (9):

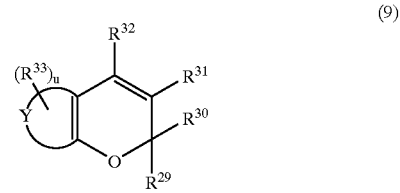

wherein a group represented by the following formula (10) is a substituted or nonsubstituted aromatic hydrocarbon group or substituted or nonsubstituted unsaturated heterocyclic group,

$R^{31}$, $R^{32}$ and $R^{33}$ are each independently a hydrogen atom, alkyl group, alkoxy group, aralkoxy group, amino group, substituted amino group, cyano group, substituted or nonsubstituted aryl group, halogen atom, aralkyl group, hydroxy group, substituted or nonsubstituted alkynyl group, substituted or nonsubstituted heterocyclic group having a nitrogen atom as a hetero atom and a pyran ring or the ring of a group represented by the above formula (10) bonded to the above nitrogen atom, or condensation heterocyclic group having an aromatic hydrocarbon ring or aromatic hetero ring condensed at the heterocyclic group, u is an integer of 0 to 6, and $R^{29}$ and $R^{30}$ are each independently a group represented by the following formula (11):

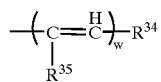

(wherein $R^{34}$ is a substituted or nonsubstituted aryl group, or substituted or nonsubstituted heteroaryl group, $R^{35}$ is a hydrogen atom, alkyl group or halogen atom, and w is an integer of 1 to 3), group represented by the following formula (12):

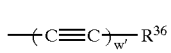

(wherein $R^{36}$ is a substituted or nonsubstituted aryl group, or substituted or nonsubstituted heteroaryl group, and w' is an integer of 1 to 3), substituted or nonsubstituted aryl group, substituted or nonsubstituted heteroaryl group, or alkyl group, or $R^{29}$ and $R^{30}$ may be bonded together to form an aliphatic hydrocarbon ring or aromatic hydrocarbon ring.

The "substituents" in the above formulas (11) and (12) and the "substituted aryl group or substituted heteroaryl group" for $R^{29}$ and $R^{30}$ are the same as substituents in the groups represented by $R^{31}$ to $R^{33}$.

More preferred examples of the chromene compound include compounds represented by the following formulas (13) to (19).

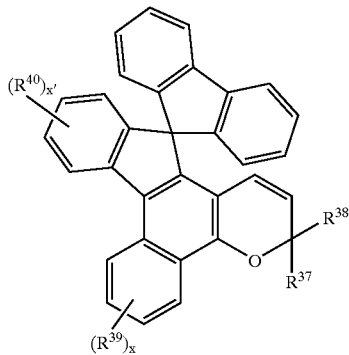

wherein $R^{37}$ and $R^{38}$ are defined the same as $R^{29}$ and $R^{30}$ in the above formula (9), $R^{39}$ and $R^{40}$ are defined the same as $R^{31}$, $R^{32}$ and $R^{33}$ in the above formula (9), and x and x' are each an integer of 0 to 3.

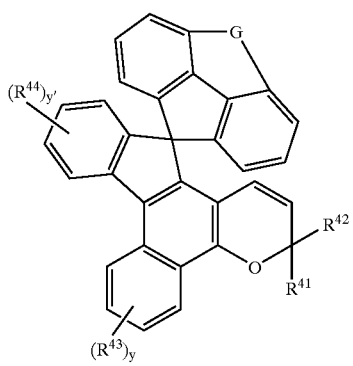

wherein $R^{41}$ and $R^{42}$ are defined the same as $R^{29}$ and $R^{30}$ in the above formula (9), $R^{43}$ and $R^{44}$ are defined the same as $R^{31}$, $R^{32}$ and $R^{33}$ in the above formula (9), and —G— is a group represented by

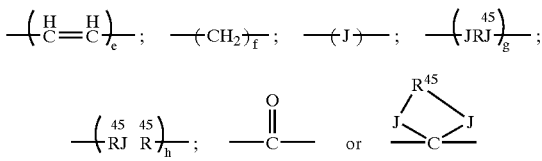

(J is an oxygen atom or sulfur atom, $R^{45}$ is an alkylene group having 1 to 6 carbon atoms, and e, f, g and h are each an integer of 1 to 4), and y and y' are each an integer of 0 to 3.

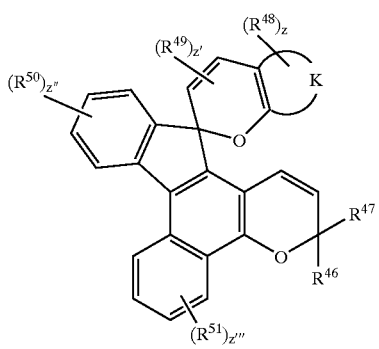

wherein $R^{46}$ and $R^{47}$ are defined the same as $R^{29}$ and $R^{30}$ in the above formula (9), $R^{48}$, $R^{49}$, $R^{50}$ and $R^{51}$ are defined the same as $R^3$, $R^3$ and $R^{33}$ in the above formula (9), the group represented by the following formula is a substituted or nonsubstituted aromatic hydrocarbon group, or substituted or nonsubstituted unsaturated heterocyclic group, and z, z', z" and z'" are each an integer of 0 to 3.

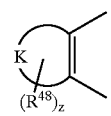

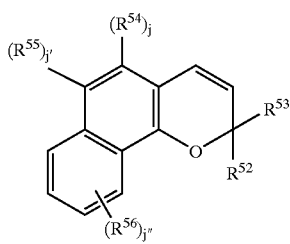

wherein $R^{52}$ and $R^{53}$ are defined the same as $R^{29}$ and $R^{30}$ in the above formula (9), $R^{54}$, $R^{55}$ and $R^{56}$ are defined the same as $R^{31}$, $R^{32}$ and $R^{33}$ in the above formula (9), and j, j' and j" are each an integer of 0 to 3.

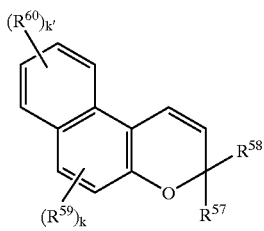

(17)

wherein $R^{57}$ and $R^{58}$ are defined the same as $R^{29}$ and $R^{30}$ in the above formula (9), $R^{59}$ and $R^{60}$ are defined the same as $R^{31}$, $R^{32}$ and $R^x$ in the above formula (9), and k and k' are each an integer of 0 to 3.

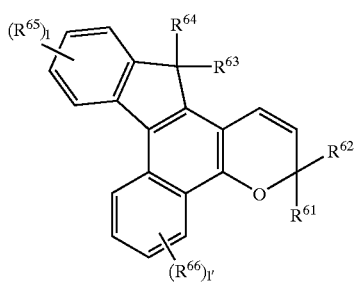

(18)

wherein $R^{61}$ and $R^{62}$ are defined the same as $R^{29}$ and $R^{30}$ in the above formula (9), $R^{63}$, $R^{64}$, $R^{65}$ and $R^{66}$ are defined the same as $R^{31}$, $R^{32}$ and $R^{33}$ in the above formula (9), and l and l' are each an integer of 0 to 3.

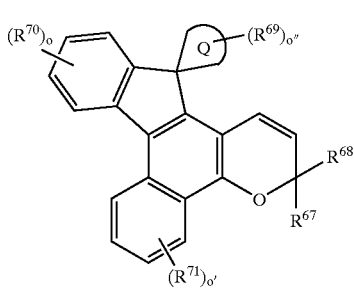

(19)

wherein $R^{67}$ and $R^{68}$ are defined the same as $R^{29}$ and $R^{30}$ in the above formula (9), $R^{69}$, $R^{70}$ and $R^{71}$ are defined the same as $R^{31}$, $R^{32}$ and $R^{33}$ in the above formula (9), the group represented by the following formula is an aliphatic hydrocarbon ring which may have at least one substituent, and o, o' and o" are each an integer of 0 to 3.

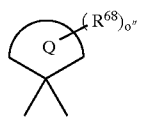

Much more preferred examples of the chromene compound of the present invention include chromene compounds having the following structures.

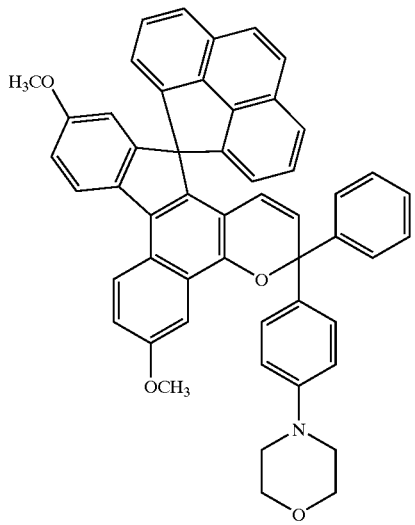

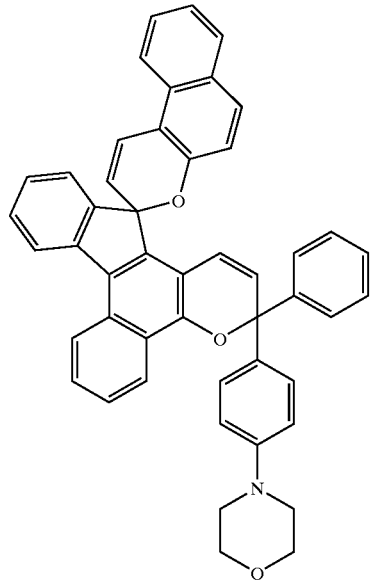

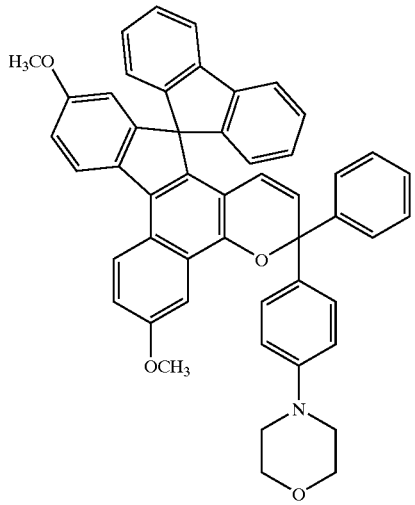

-continued

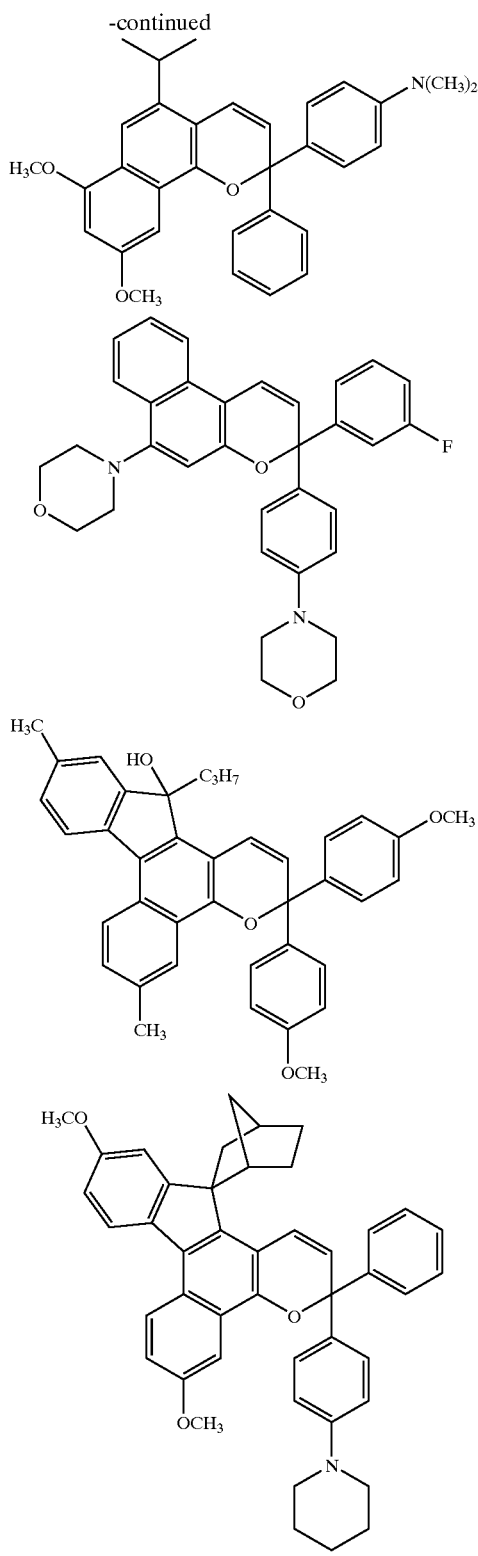

In the curable composition of the present invention, the amount of the photochromic compound is 0.0001 to 10 parts by weight, preferably 0.001 to 5 parts by weight, more preferably 0.001 to 1 part by weight based on 100 parts by weight of the total of all the radically polymerizable monomers. When the amount of the photochromic compound is smaller than 0.0001 part by weight, the color density may lower and when the amount is larger than 10 parts by weight, the photochromic compound does not dissolve in the polymerizable monomers completely, whereby the resulting solution may become heterogeneous and the color density may become nonuniform.

The curable composition of the present invention may contain additives such as a surfactant, antioxidant, radical scavenger, ultraviolet light stabilizer, ultraviolet light absorber, release agent, discoloration preventing agent, antistatic agent, fluorescent dye, dye, pigment, perfume and plasticizer to improve the durability, color developing speed, fading speed and moldability of a photochromic compound. Any known compounds may be used as the additives to be added.

For example, the surfactant may be nonionic, anionic or cationic. A nonionic surfactant is preferred from the viewpoint of solubility in polymerizable monomers. Preferred examples of the nonionic surfactant include sorbitan fatty acid esters, glycerin fatty acid esters, decaglycerin fatty acid esters, propylene glycol.pentaerythritol fatty acid esters, polyoxyethylene sorbitan fatty acid esters, polyoxyethylene sorbite fatty acid esters, polyoxyethylene glycerin fatty acid esters, polyethylene glycol fatty acid esters, polyoxyethylene alkyl ethers, polyoxyethylene phytosterol.phytostanol, polyoxyethylene polyoxypropylene alkyl ethers, polyoxyethylene alkylphenyl ethers, polyoxyethylene castor oil.hardened castor oil, polyoxyethylene lanolin.lanolin alcohol beeswax derivatives, polyoxyethylene alkylamine.fatty acid amides, polyoxyethylene alkylphenyl formaldehyde condensates and single-chain polyoxyethylene alkyl ethers. These surfactants may be used in combination of two or more. The amount of the surfactant is preferably 0.1 to 20 parts by weight based on 100 parts by weight of the total of all the polymerizable monomers.

As the antioxidant, radical scavenger, ultraviolet light stabilizer and ultraviolet light absorber may be preferably used a hindered phenol antioxidant, sulfur-based antioxidant, phenol-based radical scavenger, hindered amine light stabilizer, benzotriazole-based compound and benzophenone-based compound, respectively. These antioxidants, radical scavengers, ultraviolet light stabilizers and ultraviolet light absorbers may be used in combination of two or more. To use these non-polymerizable compounds, a surfactant may be used in conjunction with an antioxidant, radical scavenger, ultraviolet light stabilizer and ultraviolet light absorber. The total amount of the antioxidant, radical scavenger, ultraviolet light stabilizer and ultraviolet light absorber is preferably 0.001 to 1 part by weight based on 100 parts by weight of the total of all the polymerizable monomers.

The method of preparing the curable composition of the present invention is not particularly limited and may be carried out by weighing and mixing together predetermined amounts of the components. The order of adding the components is not particularly limited. All the components may be added simultaneously, or only monomer components are mixed together and then a photochromic compound and other additives may be added to and mixed with the resulting mixture right before polymerization as described hereinafter. As will be described hereinafter, a polymerization initiator may be optionally added for polymerization.

The curable composition of the present invention prepared as described above provides the photochromic cured product of the present invention which can be advantageously used as a spectacle lens or the like by polymerizing and curing it.

The method of obtaining the photochromic cured product of the present invention by curing the curable composition of the present invention is not particularly limited and a known polymerization method may be employed according to the types of monomers used. Polymerization may be started by use of a radical polymerization initiator exemplified by peroxides and azo compounds, exposure to ultraviolet light, α-ray, β-ray or γ-ray, or a combination thereof.

The polymerization method is not particularly limited. When the cured product of the present invention is used as an optical material such as a photochromic lens, cast polymerization is preferably carried out. Typical cast polymerization will be described in more detail hereinbelow.

In the above method, the curable composition of the present invention comprising a radical polymerization initiator is injected into the space between molds held by an elastomer gasket or spacer and heated in an air oven to be polymerized and cured and then the cured product is taken out.

Any known radical polymerization initiator may be used. Typical examples of the radical polymerization initiator include diacyl peroxides such as benzoyl peroxide, p-chlorobenzoyl peroxide, decanoyl peroxide, lauroyl peroxide and acetyl peroxide; peroxy esters such as t-butyl peroxy-2-ethyl hexanoate, t-butyl peroxydicarbonate, cumyl peroxyneodecanate and t-butyl peroxybenzoate; percarbonates such as diisopropyl peroxydicarbonate, di-2-ethylhexyl peroxydicarbonate and di-sec-butyloxycarbonate; and azo compounds such as 2,2'-azobisisobutyronitrile, 2,2'-azobis (4-dimethylvaleronitrile), 2,2'-azobis(2-methylbutyronitrile) and 1,1'-azobis(cyclohexane-1-carbonitrile).

The amount of the radical polymerization initiator which differs according to polymerization conditions, the type of the initiator and the type and composition of the curable composition of the present invention cannot be limited but it is preferably 0.01 to 10 parts by weight based on 100 parts by weight of the total of all the polymerizable monomers.

Out of the polymerization conditions, the temperature has an influence upon the properties of the obtained resin. As this temperature condition is influenced by the type and amount of the initiator and the types of the monomers, it cannot be limited. However, it is preferred to carry out so-called "tapered two-stage polymerization" that polymerization is started at a relatively low temperature, the temperature is raised gradually, and curing is carried out at a high temperature at the end of polymerization.

Since the polymerization time also differs according to various factors like the temperature, it is preferred to determine the optimum time according to these conditions. For example, the conditions are preferably selected to complete polymerization in 2 to 40 hours.

Cast polymerization may also be carried out by known photopolymerization using ultraviolet light. In this case, benzoin, benzoin methyl ether, benzoin butyl ether, benzophenol, acetophenone, 4,4'-dichlorobenzophenone, diethoxyacetophenone, 2-hydroxy-2-methyl-1-phenylpropan-1-one, benzylmethyl ketal, 1-(4-isopropylphenyl)-2-hydroxy-2-methylpropan-1-one, 1-hydroxycyclohexylphenyl ketone or 2-isopropylthioxanthone may be used as a photopolymerization initiator. The photopolymerization initiator is preferably used in an amount of 0.001 to 5 parts by weight based on 100 parts by weight of the total of all the monomers.

The cured product of the present invention obtained by the above method may be subjected to the following treatments according to its application purpose. That is, it may be dyed with a dispersion dye or the like, coated with a hard coat agent essentially composed of a silane coupling agent or a sol of silicon, zirconium, antimony or aluminum oxide (hard coat agent cured by a so-called "condensation method") or a hard coat agent essentially composed of an organic polymer, or subjected to an anti-reflection treatment by depositing a metal oxide thin film such as a $SiO_2$, $TiO_2$ or $ZrO_2$ film or applying an organic polymer thin film, antistatic treatment or secondary treatment.

The photochromic cured product of the present invention has excellent releasability when it is removed from a mold after molding and excellent adhesion to a coating film formed by applying a hard coat agent and curing it by the above condensation method. The above hard coat agent is generally used to improve the scratch resistance of the cured product, as exemplified by TS56 (trade name) marketed by Tokuyama Corporation.

The method of applying the above hard coat to the surface of the cured product of the present invention is not particularly limited. A coat solution essentially composed of a sol is applied to the surface of the cured product in accordance with a generally known method. For example, the cured product is immersed in the coat solution, or the coat solution is applied to the surface of the cured product by a spray, brush or roller. After coating, the coat solution is dried with dry air or in the air and heated to be cured so as to form a film. The heating temperature which differs according to the type of the cured product is 50° C. or more, preferably 60° C. or more and a temperature at which the cured product is not thermally deformed, for example, 150° C. or less. The curing temperature is 130° C. for 1 to 2 hours or 70 to 80° C. for 3 to 4hours. To improve adhesion to the cured product, a pretreatment such as a reagent treatment with an aqueous solution of sodium hydroxide, or potassium bichromate/sulfuric acid solution, or discharge treatment with plasma is preferably carried out.

EXAMPLES

The following examples are provided for the purpose of further illustrating the present invention but are in no way to be taken as limiting.

The compounds used in the following examples are as follows.

(1) Polyfunctional Radically Polymerizable Monomer (Component A)

The abbreviations and names of the compounds used are given below. The "homo-HL" within the parentheses shows the L-scale Rockwell hardness of a cured product obtained by cast homopolymerizing each monomer. As for the method of measuring the hardness, after the cured product is kept in a chamber maintained at 25° C. for 1 day, its L-scale Rockwell hardness is measured with the Akashi Rockwell hardness meter (type: AR-10).

TMPT: trimethylolpropane trimethacrylate (homo-HL=122)
PETMA: pentaerythritol tetramethacrylate (homo-HL=122)
TMM: pentaerythritol trimethacrylate
(2) Silyl Monomer (Component B)
TMSiMA: γ-methacryloyloxypropyl trimethoxysilane
DMSiMA: γ-methacryloyloxypropyl methyldimethoxysilane
(3) Radically Polymerizable Monomer other than Components A and B (Component C)
4G: tetraethylene glycol dimethacrylate (homo-HL=90)
9GDA: polyethylene glycol diacrylate having an average molecular weight of 532 (homo-HL<20)
MePEGMA (475): methyl ether polyethylene glycol methacrylate having an average molecular weight of 1,000 (homo-HL<20) ALMePEG (550): methoxypolyethylene glycol allyl ether having an average molecular weight of 550
BPE: 2,2-bis(4-methacryloyloxyethoxyphenyl)propane (homo-HL=110)

GMA: glycidyl methacrylate (homo-HL=80)
αMS: α-methylstyrene (homo-HL<40)
MSD: α-methylstyrene dimer (not homopolymerized)
(4) Photochromic Compound
chromene 1
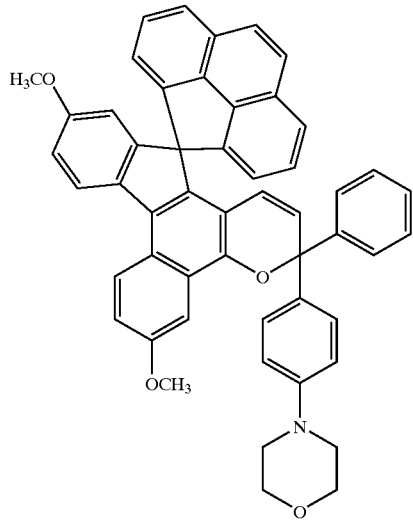
chromene 2
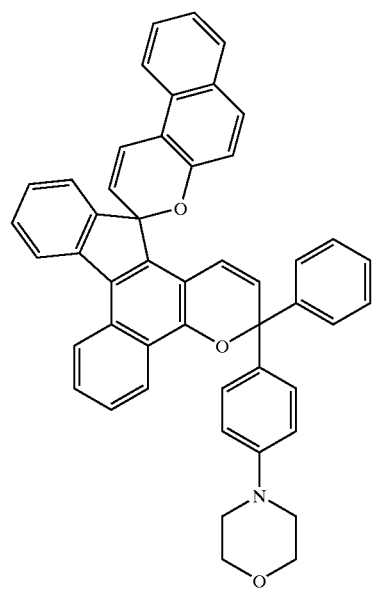
chromene 3
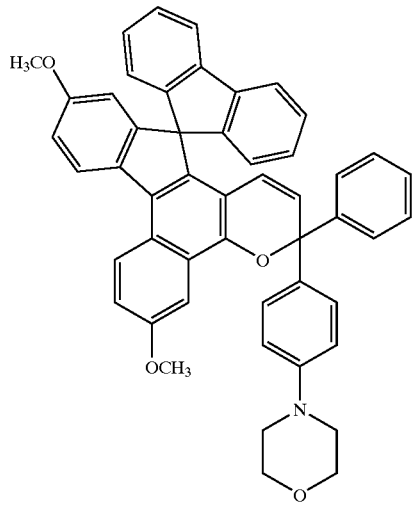
-continued
chromene 4
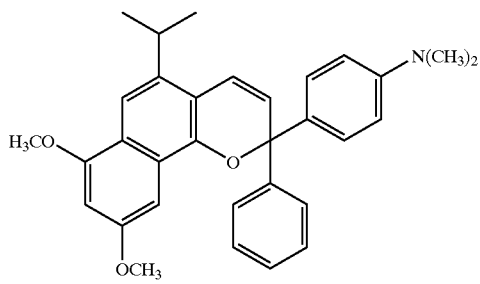
chromene 5
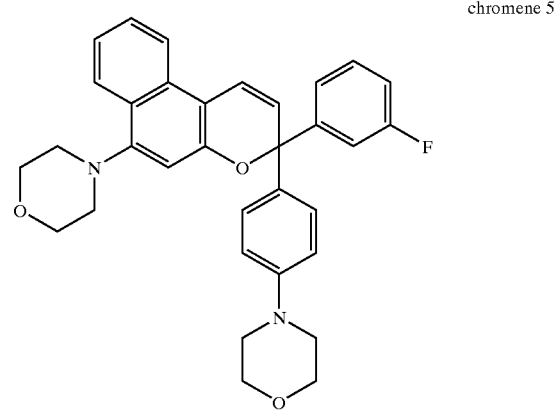
chromene 6
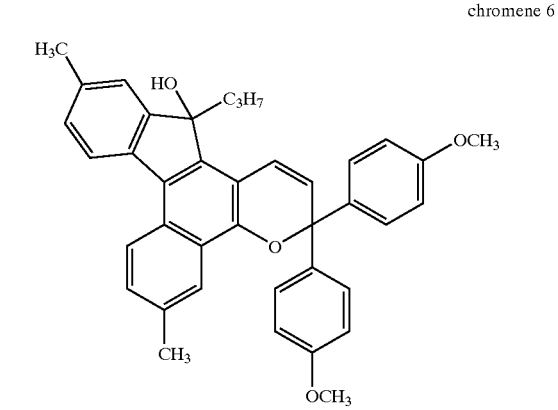
chromene 7
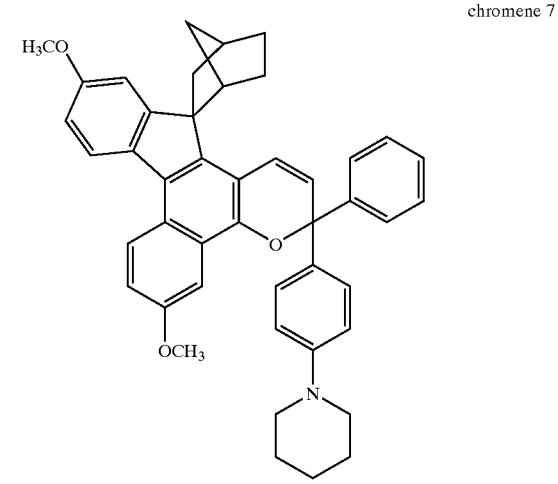
(5) Polymerization Initiator
ND: t-butyl peroxyneodecanate (trade name: Perbutyl ND, manufactured by NOF Corporation)

octaO: 1,1,3,3-tetramethylbutylperoxy-2-ethyl hexanoate (trade name: Perocta O, manufactured by NOF Corporation)
(6) Hard Coat Solution
TS56H (manufactured by Tokuyama Corporation)

Example 1

0.03 part by weight of chromene 1 and 1 part by weight of perbutyl ND as a polymerization initiator were added to and fully mixed with 100 parts by weight of polymerizable monomers consisting of 20 parts by weight of trimethylolpropane trimethacrylate, 5 parts by weight of γ-methacryloyloxypropyl trimethoxysilane, 25 parts by weight of 2,2-bis(4-methacryloyloxyethoxyphenyl)propane, 30 pats by weight of tetraethylene glycol dimethacrylate, 3 parts by weight of polyethylene glycol diacrylate having an average molecular weight of 532, 10 parts by weight of glycidyl methacrylate, 6 parts by weight of α-methylstyrene and 1 part by weight of α-methylstyrene dimer. This mixed solution was injected into a mold consisting of glass plates and a gasket comprising an ethylene-vinyl acetate copolymer to carry out cast polymerization. Polymerization was carried out in an air oven by gradually increasing the temperature from 30 to 90° C. in 18 hours and maintaining it at 90° C. for 2 hours. After the end of polymerization, the obtained polymer was taken out from the glass mold.

When releasability at this point was evaluated, it was ○. More specifically, when the polymer could be easily and completely released from the mold without being broken, releasability was evaluated as (○) and when the polymer was broken and hardly released from the mold, it was evaluated as (×).

Further, after the obtained polymer was washed with acetone and fully dried with air to be cleaned, it was immersed in a 10% NaOH aqueous solution for 10 minutes, fully washed with water and dried with air again. This polymer was immersed in a TS56H hard coat solution, pulled up at a rate of 30 mm/min, pre-dried at 60° C. for 15 minutes and cured by heating at 130° C. for 2 hours to form a hard coat on the surface of the polymer.

The obtained polymer (thickness of 2 mm) was used as a sample and exposed to light from the L-2480 (300 W) SHL-100 xenon lamp of Hamamatsu Photonics Co., Ltd. at a beam intensity on the surface of the polymer of 365 nm=2.4 mW/cm$^2$ or 245 nm=24 μW/cm$^2$ and at 20° C. ±1° C. for 120 seconds through an aeromass filter (of Corning Co., Ltd.) to develop color so as to measure the photochromism of the sample. The photochromism was evaluated by the following methods.

(1) maximum absorption wavelength (λmax): the maximum absorption wavelength after color development, obtained by the spectrophotometer (MCPD1000 instantaneous multichannel photodetector) of Otsuka Denshi Kogyo Co., Ltd. The maximum absorption wavelength is connected with the tone of developed color.

(2) color density {ε(120)−ε(0)}: the difference between absorbance {ε(120)} after 120 seconds of exposure at the above maximum absorption wavelength and the above ε(0). As this value become larger, photochromism is better.

(3) fading speed [t½ (min.)]: the time required until the absorbance at the above maximum wavelength of the sample drops to ½ of {ε(120)−ε(0)} when irradiation is stopped after 120 seconds of exposure. As the time becomes shorter, photochromism is better.

(4) durability (%)={($A_{200}$/$A_0$)×100)}: The following deterioration promotion test was conducted to evaluate color development durability by exposure. That is, the deterioration of the obtained polymer (sample) was promoted by the X25 xenon weather meter of Suga Shikenki Co., Ltd. for 200 hours. Thereafter, the above evaluation of color density was carried out before and after the test to measure color density ($A_0$) before the test and color density ($A_{200}$) after the test. The residual rate (%) was obtained from {($A_{200}$/$A_0$)×100} and used as an index of color development durability. As the residual rate becomes higher, the color development durability is higher.

Further, the characteristic properties of a hard coat were evaluated by the following tests.

(5) adhesion test: The surface of a sample was cut into 100 1 mm×1 mm squares with a sharp cutter knife, and commercially available Cellotape was affixed to the surface and stripped quickly from the sample. When all of the squares were unremoved, adhesion was evaluated as ○, when some of the squares were removed, adhesion was evaluated as Δ, and when all of the squares were removed, adhesion was evaluated as ×.

(6) scratch resistance test: #0000 steel wool was set in the scratch resistance tester of Fukuda Kikai Kogyo Co., Ltd. and the sample was rubbed by moving the steel wool back and forth 10 times over the surface thereof under a load of 1 kg to observe the scratch resistance of the sample visually. The scratch resistance of the sample was evaluated based on five criteria A to E, that is, when the surface of the sample was not scratched at all, the scratch resistance was evaluated as A and when the surface of the polyallyl diethylene glycol carbonate base of the sample was badly scratched, the scratch resistance was evaluated as E.

As a result, the sample had a λmax of 610 nm, a color density of 0.75, a fading speed of 1.2 minutes and a durability of 72%, and its adhesion was evaluated as ○ and its scratch resistance was evaluated as B.

Examples 2 to 20

Photochromic cured products were obtained and evaluated for their characteristic properties in the same manner as in Example 1 except that radically polymerizable monomer compositions, chromene compounds and other additives shown in Table 1 were used.

TABLE 1

| Ex. No. | component A (parts by weight) | component B (parts by weight) | component C (parts by weight) | polymerization initiator (parts by weight) | chromene compound (parts by weight) |
|---|---|---|---|---|---|
| 1 | TMPT 20 | TMSiMA 5 | BPE/4G/MePEGMA (475)/GMA/αMS/MSD 25/23/10/10/6/1 | ND 1 | chromene 1 0.03 |
| 2 | TMPT 20 | TMSiMA 1 | BPE/4G/MePEGMA (475)/GMA/αMS/MSD 25/27/10/10/6/1 | ND 1 | chromene 1 0.03 |

TABLE 1-continued

| Ex. No. | component A (parts by weight) | component B (parts by weight) | component C (parts by weight) | polymerization initiator (parts by weight) | chromene compound (parts by weight) |
|---|---|---|---|---|---|
| 3 | TMPT 20 | TMSiMA 10 | BPE/4G/MePEGMA (475)/GMA/αMS/MSD 25/18/10/10/6/1 | ND 1 | chromene 1 0.03 |
| 4 | TMPT 20 | TMSiMA 20 | BPE/4G/MePEGMA (475)/GMA/αMS/MSD 25/8/10/10/6/1 | ND 1 | chromene 1 0.03 |
| 5 | TMPT 20 | TMSiMA 5 | BPE/4G/9GA/GMA/αMS/MSD 25/30/3/10/6/1 | ND 1 | chromene 1 0.03 |
| 6 | TMPT 20 | DMSiMA 5 | BPE/4G/9GA/GMA/αMS/MSD 25/30/3/10/6/1 | ND 1 | chromene 1 0.03 |
| 7 | TMPT 20 | TMSiMA 5 | BPE/4G/ALMePEG (550)/GMA/αMS/MSD 25/30/2/10/5/3 | ND/octaO 0.7/0.1 | chromene 1 0.03 |
| 8 | PETMA 20 | TMSiMA 5 | 4G/MePEGMA (475)/GMA/αMS/MSD 47/10/10/6/1 | ND 1 | chromene 1 0.03 |
| 9 | TMM 20 | TMSiMA 5 | 4G/MePEGMA (475)/GMA/αMS/MSD 47/10/10/6/1 | ND 1 | chromene 1 0.03 |
| 10 | TMPT 5 | TMSiMA 5 | BPE/4G/MePEGMA (475)/GMA/αMS/MSD 25/38/10/10/6/1 | ND 1 | chromene 1 0.03 |
| 11 | TMPT 30 | TMSiMA 5 | BPE/4G/MePEGMA (475)/GMA/αMS/MSD 25/13/10/10/6/1 | ND 1 | chromene 1 0.03 |
| 12 | TMPT 20 | TMSiMA 5 | BPE/4G/MePEGMA (475)/GMA/αMS/MSD 25/23/10/10/6/1 | ND 1 | chromene 1/chromene 5 0.03/0.02 |
| 13 | TMPT 20 | DMSiMA 0.5 | BPE/4G/9GA/GMA/αMS/MSD 25/34.5/3/10/6/1 | ND 1 | chromene 1 0.03 |
| 14 | TMPT 20 | DMSiMA 10 | BPE/4G/9GA/GMA/αMS/MSD 25/25/3/10/6/1 | ND 1 | chromene 1 0.03 |
| 15 | TMPT 20 | TMSiMA 5 | BPE/4G/MePEGMA (475)/GMA/αMS/MSD 25/23/10/10/6/1 | ND 1 | chromene 2 0.03 |
| 16 | TMPT 20 | TMSiMA 5 | BPE/4G/MePEGMA (475)/GMA/αMS/MSD 25/23/10/10/6/1 | ND 1 | chromene 3 0.03 |
| 17 | TMPT 20 | TMSiMA 5 | BPE/4G/MePEGMA (475)/GMA/αMS/MSD 25/23/10/10/6/1 | ND 1 | chromene 4 0.03 |
| 18 | PETMA 20 | TMSiMA 5 | BPE/4G/MePEGMA (475)/GMA/αMS/MSD 25/23/10/10/6/1 | ND 1 | chromene 5 0.03 |
| 19 | TMPT 20 | TMSiMA 5 | BPE/4G/MePEGMA (475)/GMA/αMS/MSD 25/23/10/10/6/1 | ND 1 | chromene 6 0.03 |
| 20 | TMPT 20 | TMSiMA 5 | BPE/4G/MePEGMA (475)/GMA/αMS/MSD 25/23/10/10/6/1 | ND 1 | chromene 7 0.03 |

Ex.: Example
The results are shown in Table 2.

TABLE 2

| Ex. No. | λmax (nm) | color density | fading speed (min) | durability (%) | adhesion | scratch resistance | releasability |
|---|---|---|---|---|---|---|---|
| 1 | 610 | 0.75 | 1.2 | 72 | ○ | B | ○ |
| 2 | 610 | 0.78 | 1.2 | 72 | ○ | B | ○ |
| 3 | 610 | 0.72 | 1.2 | 72 | ○ | B | ○ |
| 4 | 610 | 0.7 | 1.3 | 72 | ○ | B | ○ |
| 5 | 610 | 0.8 | 1.2 | 72 | ○ | B | ○ |
| 6 | 610 | 0.8 | 1.2 | 72 | ○ | B | ○ |
| 7 | 610 | 0.65 | 1.3 | 72 | ○ | B | ○ |
| 8 | 610 | 0.7 | 1.4 | 72 | ○ | B | ○ |
| 9 | 610 | 0.7 | 1.1 | 72 | ○ | B | ○ |
| 10 | 610 | 0.65 | 1.5 | 73 | ○ | B | ○ |
| 11 | 610 | 0.8 | 1 | 72 | ○ | B | ○ |
| 12 | 484 | 0.7 | 1.3 | 70 | ○ | B | ○ |
|  | 600 | 0.7 | 1.2 | 72 |  |  |  |
| 13 | 610 | 0.75 | 1.2 | 72 | ○ | B | ○ |
| 14 | 610 | 0.75 | 1.2 | 72 | ○ | B | ○ |
| 15 | 580 | 0.78 | 1.6 | 65 | ○ | B | ○ |
| 16 | 600 | 0.7 | 1.8 | 70 | ○ | B | ○ |
| 17 | 588 | 0.7 | 3 | 60 | ○ | B | ○ |
| 18 | 474 | 0.8 | 1.3 | 70 | ○ | B | ○ |
| 19 | 576 | 0.7 | 1.8 | 65 | ○ | B | ○ |
| 20 | 570 | 0.9 | 1 | 74 | ○ | B | ○ |

Ex.: Example

Comparative Examples 1 to 18

For comparison, photochromic cured products were obtained and evaluated for their characteristic properties in the same manner as in Example 1 except that polymerizable monomer compositions and chromene compounds shown in Table 3 were used.

TABLE 3

| Ex. No. | component A (parts by weight) | component B (parts by weight) | component C (parts by weight) | polymerization initiator (parts by weight) | chromene compound (parts by weight) |
|---|---|---|---|---|---|
| 1 | TMPT 20 | — | BPE/4G/MePEGMA (475)/GMA/αMS/MSD 25/28/10/10/6/1 | ND 1 | chromene 1 0.03 |
| 2 | — | — | BPE/4G/MePEGMA (475)/GMA/αMS/MSD 45/28/10/10/6/1 | ND 1 | chromene 1 0.03 |
| 3 | TMPT 20 | TMSiMA 0.1 | BPE/4G/MePEGMA (475)/GMA/αMS/MSD 25/32.5/10/10/6/1 | ND 1 | chromene 1 0.03 |
| 4 | TMPT 20 | TMSiMA 40 | BPE/4G/MePEGMA (475)/GMA/αMS/MSD 10/3/10/10/6/1 | ND 1 | chromene 1 0.03 |
| 5 | TMPT 20 | DMSiMA 0.1 | BPE/4G/MePEGMA (475)/GMA/αMS/MSD 25/32.5/10/10/6/1 | ND 1 | chromene 1 0.03 |
| 6 | TMPT 20 | DMSiMA 40 | BPE/4G/MePEGMA (475)/GMA/αMS/MSD 10/3/10/10/6/1 | ND 1 | chromene 1 0.03 |
| 7 | TMPT 20 | — | BPE/4G/MePEGMA (475)/GMA/αMS/MSD 25/28/10/10/6/1 | ND 1 | chromene 2 0.03 |
| 8 | — | — | BPE/4G/MePEGMA (475)/GMA/αMS/MSD 45/28/10/10/6/1 | ND 1 | chromene 2 0.05 |
| 9 | TMPT 20 | — | BPE/4G/MePEGMA (475)/GMA/αMS/MSD 25/28/10/10/6/1 | ND 1 | chromene 3 0.03 |
| 10 | — | — | BPE/4G/MePEGMA (475)/GMA/αMS/MSD 45/28/10/10/6/1 | ND 1 | chromene 3 0.05 |
| 11 | TMPT 20 | — | BPE/4G/MePEGMA (475)/GMA/αMS/MSD 25/28/10/10/6/1 | ND 1 | chromene 4 0.03 |
| 12 | — | — | BPE/4G/MePEGMA (475)/GMA/αMS/MSD 45/28/10/10/6/1 | ND 1 | chromene 4 0.05 |
| 13 | TMPT 20 | — | BPE/4G/MePEGMA (475)/GMA/αMS/MSD 25/28/10/10/6/1 | ND 1 | chromene 5 0.03 |
| 14 | — | — | BPE/4G/MePEGMA (475)/GMA/αMS/MSD 45/28/10/10/6/1 | ND 1 | chromene 5 0.03 |
| 15 | TMPT 20 | — | BPE/4G/MePEGMA (475)/GMA/αMS/MSD 25/28/10/10/6/1 | ND 1 | chromene 6 0.03 |
| 16 | — | — | BPE/4G/MePEGMA (475)/GMA/αMS/MSD 45/28/10/10/6/1 | ND 1 | chromene 6 0.03 |
| 17 | TMPT 20 | — | BPE/4G/MePEGMA (475)/GMA/αMS/MSD 25/28/10/10/6/1 | ND 1 | chromene 7 0.03 |
| 18 | — | — | BPE/4G/MePEGMA (475)/GMA/αMS/MSD 45/28/10/10/6/1 | ND 1 | chromene 7 0.03 |

Ex.: Example
The results are shown in Table 4.

TABLE 4

| C. Ex. No. | λmax (nm) | color density | fading speed (min) | durability (%) | adhesion | scratch resistance | releasability |
|---|---|---|---|---|---|---|---|
| 1 | 610 | 0.75 | 1.2 | 72 | X | D | ○ |
| 2 | 610 | 0.3 | 6 | 72 | ○ | B | ○ |
| 3 | 610 | 0.75 | 1.2 | 72 | X | D | ○ |
| 4 | 610 | 0.7 | 1.3 | 71 | ○ | B | X |
| 5 | 610 | 0.75 | 1.2 | 72 | X | D | ○ |
| 6 | 610 | 0.7 | 1.3 | 71 | ○ | B | X |
| 7 | 580 | 0.78 | 1.6 | 65 | X | D | ○ |
| 8 | 584 | 0.3 | 6 | 68 | ○ | B | ○ |
| 9 | 600 | 0.7 | 1.8 | 70 | X | D | ○ |
| 10 | 600 | 0.35 | 6.5 | 70 | ○ | B | ○ |
| 11 | 588 | 0.7 | 3 | 60 | X | D | ○ |
| 12 | 588 | 0.5 | 8 | 60 | ○ | B | ○ |
| 13 | 474 | 0.8 | 1.3 | 70 | X | D | ○ |
| 14 | 474 | 0.7 | 4 | 70 | ○ | B | ○ |
| 15 | 576 | 0.7 | 1.8 | 65 | X | D | ○ |
| 16 | 576 | 0.3 | 5 | 65 | ○ | B | ○ |
| 17 | 570 | 0.9 | 1 | 74 | X | D | ○ |
| 18 | 570 | 0.4 | 5 | 70 | ○ | B | ○ |

C. Ex.: Comparative Example

As having been described above, a matrix comprising polymerizable monomers containing no polyfunctional polymerizable monomer and no silyl monomer has a low fading speed of photochromism and low adhesion to a hard coat. A matrix containing a large amount of a silyl monomer has low stripping work efficiency and accordingly low productivity. Therefore, it can be understood that the curable composition of the present invention which comprises a suitable amount of a polyfunctional polymerizable monomer, a suitable amount of a silyl monomer and another radically polymerizable monomer can satisfy requirements for photochromism, adhesion to a hard coat and stripping work efficiency.

The photochromic cured products of the present invention in Examples 1 to 20 are excellent in balance among photochromism such as color density and fading speed, adhesion to a hard coat and stripping work efficiency, compared with the photochromic cured products of Comparative Examples 1 to 18.

The photochromic cured product of the present invention which has extremely excellent photochromism such as high color density and high fading speed, excellent adhesion to a hard coat and excellent stripping work efficiency can be obtained from the curable composition of the present invention.

Since the photochromic cured product of the present invention has the above excellent features, it is extremely useful as an optical material such as a photochromic lens material.

What is claimed is:

1. A curable composition comprising:
   (A) a polyfunctional radically polymerizable monomer having at least three polymerizable groups in the molecule wherein said polyfunctional radically polymerizable monomer is represented by the following formula (2) or (2'):

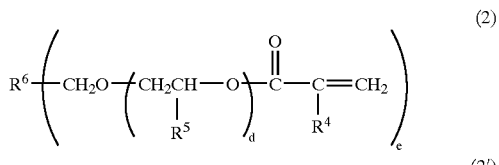

(2)

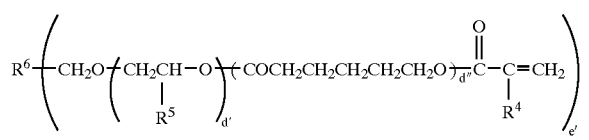

(2')

wherein $R^4$ and $R^5$ are each independently a hydrogen atom, methyl group or ethyl group, $R^6$ is a tervalent to hexavalent organic group, d, d' and d" are each independently an integer of 0 to 3, and e and e' are each independently an integer of 3 to 6, and optionally an additional polyfunctional radically polymerizable monomer having at least three polymerizable groups in the molecule;
   (B) a radically polymerizable monomer having a silanol group or a group capable of forming a silanol group by hydrolysis;
   (C) another radically polymerizable monomer different from the above components (A) and (B); and
   (D) a photochromic compound, wherein
   said components (A), (B), and (C) are contained in amounts of 1 to 50 wt %, 0.5 to 20 wt % and 30 to 98.5 wt % based on the total of the components (A), (B), and (C), respectively, and said component (D) is contained in an amount of 0.0001 to 10 parts by weight based on 100 parts by weight of the total of said components (A), (B), and (C).

2. The curable composition of claim 1, wherein said radically polymerizable monomer (B) is a silyl group-containing monofunctional (meth)acrylate represented by the following formula (1):

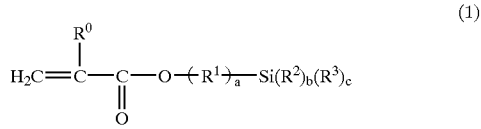

(1)

wherein $R^0$ is a hydrogen or methyl group, $R^1$ is an alkylene group having 1 to 20 carbon atoms, $R^2$ is an alkyl group or alkoxy group, $R^3$ is an alkoxy group, a is 1, b is an integer of 0 to 2, and c is an integer of 1 to 3, with the proviso that b+c=3.

3. The curable composition of claim 1, wherein said polyfunctional radically polymerizable monomer (A) forms a homopolymer that has a L-scale Rockwell hardness of 60 or more.

4. The curable composition of claim 1, wherein said another radically polymerizable monomer (C) is at least one member selected from the group consisting of (i) a bifunctional polymerizable monomer which homopolymer has a L-scale Rockwell hardness of 60 or more, (ii) a polymerizable monomer having at least one radically polymerizable group and at least one epoxy group in the molecule, (iii) a polymerizable monomer which homopolymer has a L-scale Rockwell hardness of 40 or less, (iv) a polymerizable monomer which is an allyl (thio)ether represented by the following formula (8):

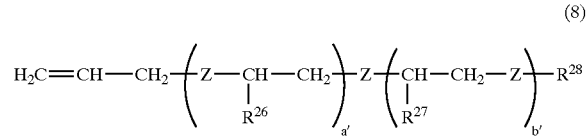

(8)

wherein $R^{26}$ and $R^{27}$ are each independently a hydrogen atom or alkyl group, $R^{28}$ is an alkyl group, acyl group, acryloyl group, methacryloyl group, vinyl group or styryl group, Z is an oxygen atom or sulfur atom, and a' and b' are each independently an integer of 0 to 20, with the proviso that a'+b'=3 to 20, and (v) another polymerizable monomer different from the above components (i) to (iv).

5. The curable composition of claim 4, wherein said another radically polymerizable monomer (C) is a combination of the above components (i), (ii), and (iii) or a combination of the above components (i), (ii), (iii) and (v).

6. The curable composition of claim 4, wherein said another radically polymerizable monomer (C) is a combination of the above components (i), (ii), and (iv) or a combination of the above components (i), (ii), (iv) and (v).

7. A photochromic cured product which is a cured product of the curable composition of any one of claims 1–6.

* * * * *